United States Patent [19]
Domy et al.

[11] Patent Number: 5,396,525
[45] Date of Patent: Mar. 7, 1995

[54] METHOD AND DEVICE FOR REPAIRING THE INTERNAL SURFACE OF AN ADAPTER PASSING THROUGH THE HEAD OF THE VESSEL OF NUCLEAR REACTOR

[75] Inventors: Alain Domy, Cuisery; Claude Hebert, Le Breuil; Laurent Brayer, Epervans, all of France

[73] Assignee: Framatome, Courbevoie, France

[21] Appl. No.: 151,840

[22] Filed: Nov. 15, 1993

[30] Foreign Application Priority Data

Nov. 13, 1992 [FR] France ................ 92 13693

[51] Int. Cl.⁶ .......................................... G21C 17/00
[52] U.S. Cl. ................................ 376/249; 376/248; 376/260; 29/402.06
[58] Field of Search ............... 376/248, 249, 250, 260, 376/307; 29/402.06, 402.11

[56] References Cited
U.S. PATENT DOCUMENTS

| | | | |
|---|---|---|---|
| 4,311,556 | 1/1982 | Iwamoto et al. | 376/249 |
| 5,115,136 | 5/1992 | Tomasch | 250/461.1 |

FOREIGN PATENT DOCUMENTS

| | | |
|---|---|---|
| 433179 | 6/1991 | European Pat. Off. . |
| 2810487 | 9/1979 | Germany . |
| 2012959 | 8/1979 | United Kingdom . |

*Primary Examiner*—Daniel D. Wasil
*Attorney, Agent, or Firm*—Pollock, Vande Sande & Priddy

[57] ABSTRACT

A detection and inspection of cracks (135) on the internal surface of the adapter (2) is carried out, at least in a zone close to the weld for fastening the adapter (2), using remote inspection operations comprising at least one dye penetration inspection with remote borescope examination of the cracks (135) revealed by the dye penetration. At least one excavation cavity (136) is made by machining to a specified depth of the internal surface of the adapter (2) having a crack (135). As a function of the result of the dye penetration inspection, the zone is or is not built back up after excavation. The device comprises an assembly for moving a rod in translation and in rotation inside the adapter. Brushing, cleaning or sprinkling devices, a device for moving a borescope support inside the adapter and tooling for machining the internal surface of the adapter may be fastened to the end of the rod.

6 Claims, 10 Drawing Sheets

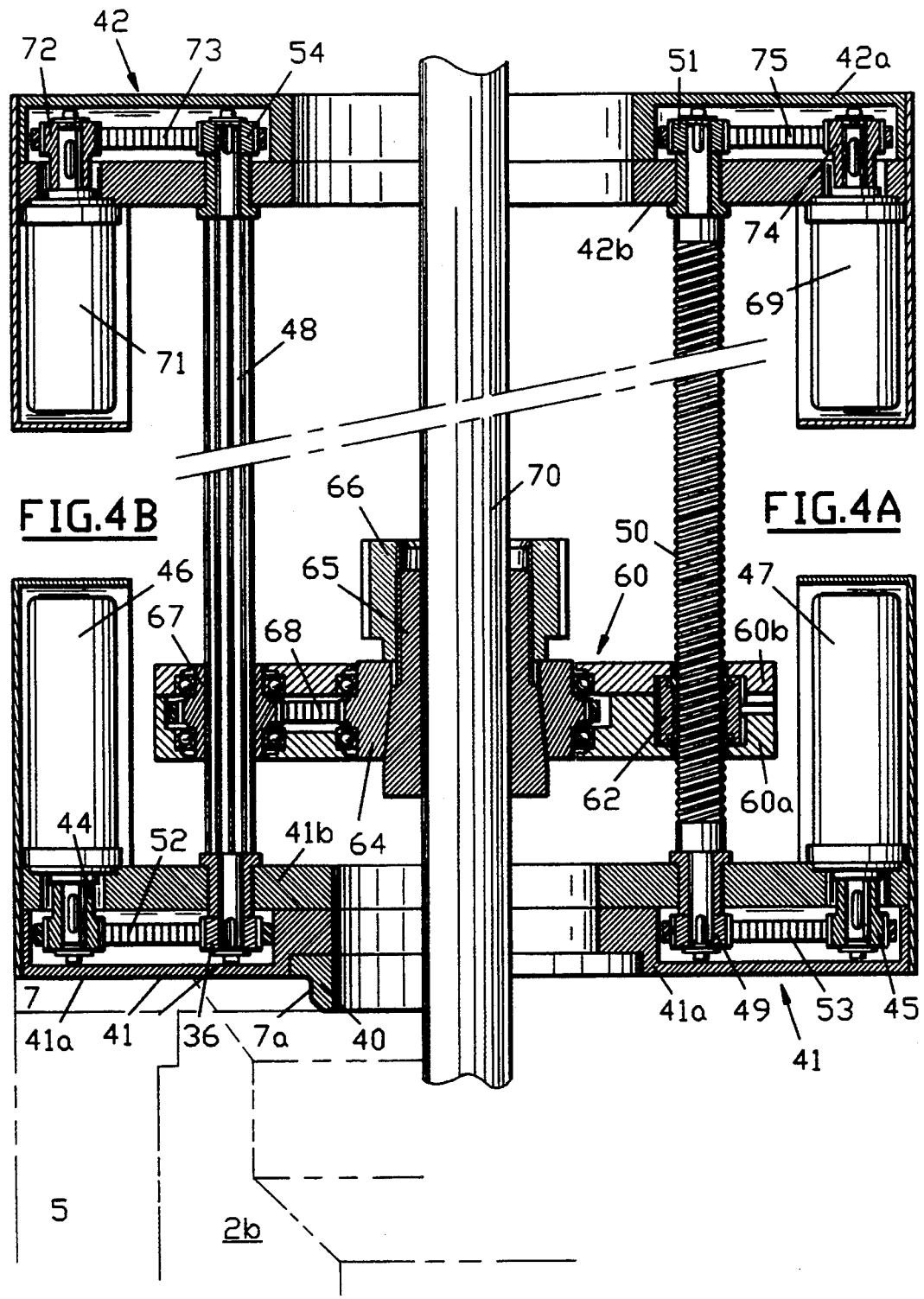

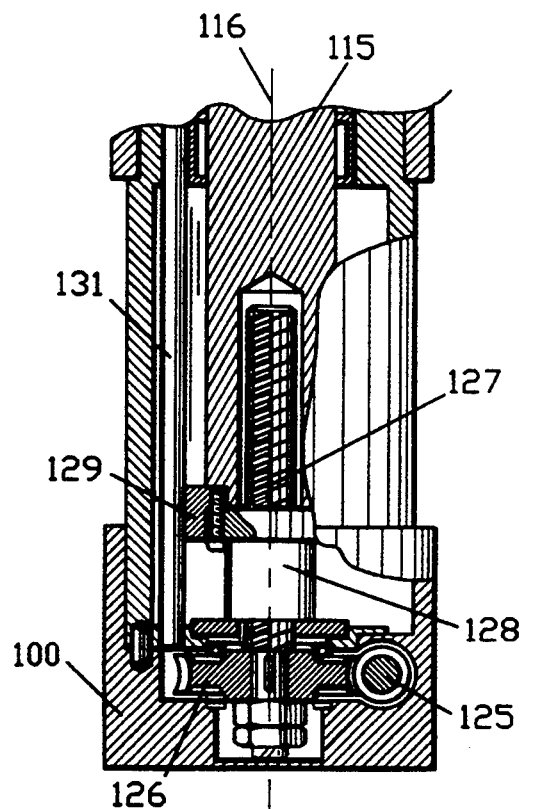
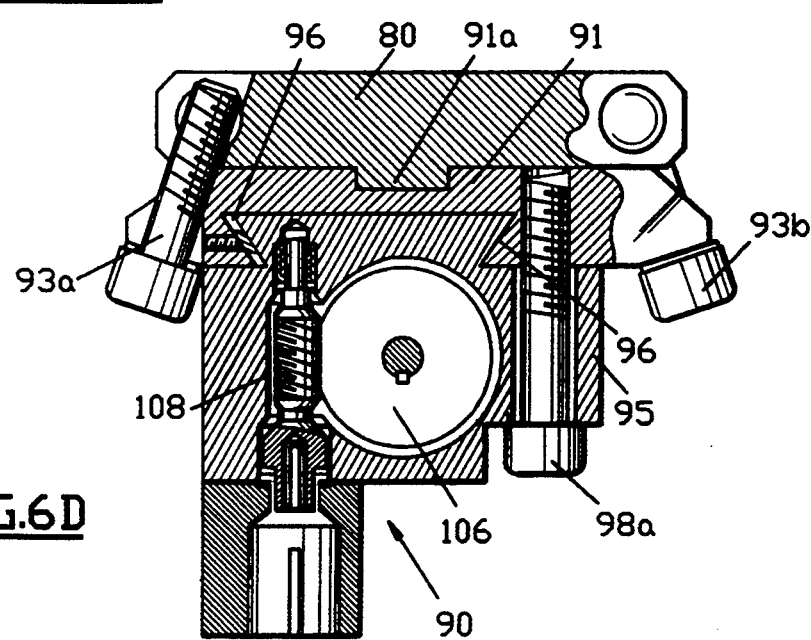

METHOD AND DEVICE FOR REPAIRING THE INTERNAL SURFACE OF AN ADAPTER PASSING THROUGH THE HEAD OF THE VESSEL OF NUCLEAR REACTOR

FIELD OF THE INVENTION

The invention relates to a method and a device for repairing the internal surface of an adapter of tubular shape passing through the head of the vessel of a nuclear reactor cooled by pressurized water.

BACKGROUND OF THE INVENTION

Pressurized-water nuclear reactors generally comprise a vessel enclosing the core of the reactor which is immersed in the pressurized cooling water of the reactor.

The vessel of the reactor of overall cylindrical shape comprises a head of hemispherical shape which may be attached onto its upper part.

The head is pierced with openings in the region of each of which there is fastened, by welding, a tubular penetration piece constituting an adapter providing the passage for and controlling the movement of an extension of a control cluster for the reactivity of the core or a penetration passage for means for measurement inside the core, such as a thermocouple column.

To the end parts of each of the adapters, there are fastened mechanisms for controlling movement of the control clusters for the reactivity of the core.

Inside each of the tubular penetrations of the vessel head there is fastened, in a position which is coaxial with respect to the tubular penetration piece and with a certain radial clearance, a thermal sleeve which comprises a diametrically flared part coming to rest on a diametrically flared bearing surface located at the upper part of the bore of the tubular penetration piece and which is mounted to rotate freely inside the penetration piece.

The extensions of the rods for controlling the reactivity of the nuclear reactor and the thermocouple columns pass through the vessel head inside thermal sleeves which are themselves arranged coaxially inside adapters for the control rods or more generally inside tubular penetration pieces of the head.

In order to increase the reliability and operational safety of nuclear reactors and to extend the durability of these reactors, plant operators are led to carry out more and more numerous inspections of the various elements making up the nuclear reactor.

In particular, it may be necessary to inspect the state of the penetration pieces of the head of the vessel in order to be sure of the integrity of these pieces after the reactor has been in operation for a certain time, in particular in the zone where these tubular pieces are welded to the head. As a function of the result of the inspection, detected faults may be repaired, by excavating the internal surface of the adapter in the zone having a fault and by building back up the cavity produced by excavation.

In French Patent Application No. 92 02405 filed by FRAMATOME and Electricite de France on Feb. 28, 1992, it was proposed to carry out an inspection of the internal surface of the adapter using ultrasound or eddy currents, through a slit machined in the thermal sleeve in its longitudinal direction. It was also proposed to carry out excavation by machining through the slit, when a crack is detected on the internal surface of the adapter.

In French Patent Application No. 92 02405, filed on Aug. 6, 1992 by FRAMATOME, it was also proposed to excavate zones having faults by machining the internal surface of the adapter to a slit made in the thermal sleeve using a jet of pressurized abrasive liquid.

These methods make it possible to inspect and, if necessary, repair faults without dismantling the thermal sleeve arranged inside the adapter.

However, such methods do not make it possible perfectly to characterise the faults detected and in particular to determine whether these faults extend deeply into the wall of the adapter, and, for this reason, whether they are likely to pass through this wall or to develop so as to become penetrant.

By using the methods according to the prior art, one may be led to carry out repairs with excavation and building back up, which are not strictly necessary for the safety of the nuclear reactor.

Neither do the inspections carried out make it possible to determine very precisely the location, extent and geometric shape of the faults detected.

SUMMARY OF THE INVENTION

The object of the invention is to propose a method for repairing the internal surface of an adapter of tubular shape passing through the head of the vessel of a nuclear reactor cooled by pressurized water and fastened to the head by a weld, which makes it possible to repair the adapter in, and only in, each zone of the internal wall of the adapter having faults likely to decrease the safety of the nuclear reactor.

To this end:
- a detection and inspection of cracks on the internal surface of the adapter is carried out, at least in a zone close to the weld, using remote inspection operations comprising at least one dye penetration inspection with remote borescope examination of the cracks revealed by the dye penetration,
- at least one excavation cavity is made by machining to a specified depth of each of the zones of the internal surface of the adapter having a crack, and
- as a function of the result of the dye penetration inspection in each of the zone having a crack, the zone is or is not built back up after excavation.

The invention also relates to a device for repairing the internal surface of an adapter comprising means making it possible successively to bring faults to light by dye penetration, to examine the faults brought to light using a borescope, to excavate the zones of the internal surface of the adaptor having faults and to build the zones back up after excavation.

BRIEF DESCRIPTION OF THE DRAWINGS

In order to make the invention clearly understood, there will now be described, by way of example, a repair method according to the invention with dye penetration inspection, and the device used for carrying out the inspection and the repair.

FIG. 4A is a sectional view through a vertical plane, in the direction of arrow A of FIG. 5, of a device making it possible to carry out a borescope examination of the internal surface of an adapter, by carrying out a dye penetration inspection operation.

FIG. 4B is a sectional view in the direction of arrow B of FIG. 5, of the borescope examination device.

FIG. 6C is a sectional view in the direction of arrow C of FIG. 6B.

FIG. 6D is a section view in the direction of arrow D of FIG. 6B.

DETAILED DESCRIPTION

Figure 1:
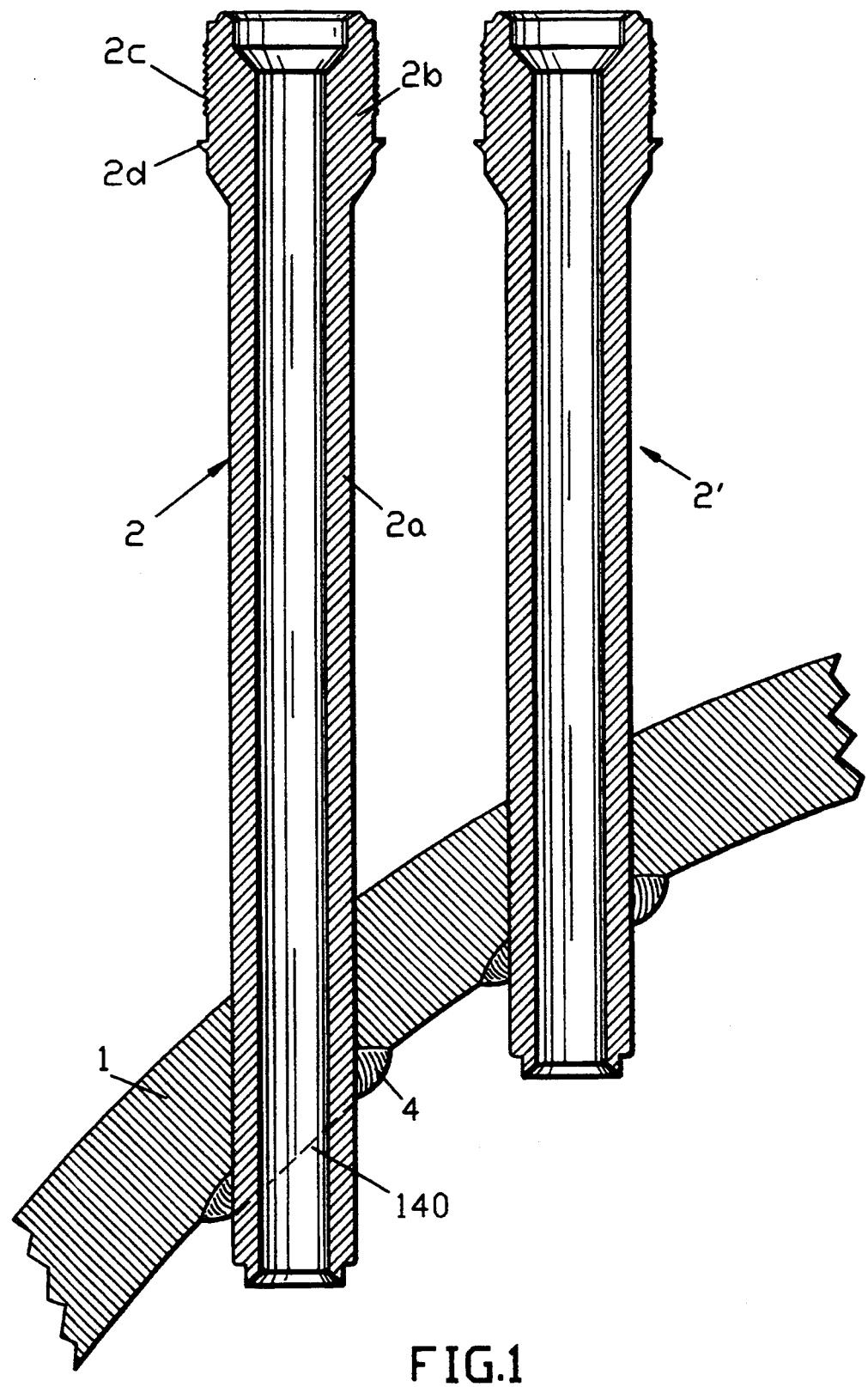
FIG. 1 is a sectional view through a vertical plane of part of a vessel head of a pressurized-water nuclear reactor and of two adapters passing through the vessel head.

FIG. 1 shows part of the domed head 1 of a pressurized-water nuclear reactor, penetrated by two tubular adapters 2 and 2'.

The set of adapters passing through the vessel head, such as the adapters 2 and 2', comprise upper ends located at the same level, above the vessel head 1.

The lower parts of the adapters which project under the vessel head are situated at different levels according to their position on the domed vessel head.

The adapter 2 will now be described in more detail, the adapter 2' having the same overall shape as the adapter 2, but being shorter.

The adapter 2 comprises a tubular part 2a of cylindrical shape passing through the vessel head and a diametrically flared upper part 2b comprising an external thread 2c intended for fastening a mechanism for moving a control cluster for the reactivity of the core and a lip 2d intended to supplement the fastening of the control mechanism which is welded along the lip 2d.

The adapter 2 is fastened to the vessel head by an annular weld 4 made on a chamfer machine around the passage opening of the adapter, on the lower surface of the head 1.

The operation of welding the adapter to produce the welded joint 4 may give rise to the formation, on the internal surface of the adapter, of the beginnings of cracks which are capable of developing during the operation of the nuclear reactor.

For reasons of safety, it proves necessary to carry out inspections of the internal surface of the adapters of nuclear reactor vessel heads periodically during shutdown periods for maintenance and refuelling of the nuclear reactor.

The inspections, and, if necessary, the repairs are carried out after dismantling the head and laying it down on a support in the position shown in FIG. 1 (in the cap position).

Prior to the inspection and repair operations according to the invention, which will be described later, the control mechanisms of the adapters and their thermal sleeves arranged inside the adapters (not shown in FIG. 1) are dismantled. The adapters on which the interventions which will be described are performed are situated, at the moment of these interventions, in the state represented in FIG. 1.

Figure 2:
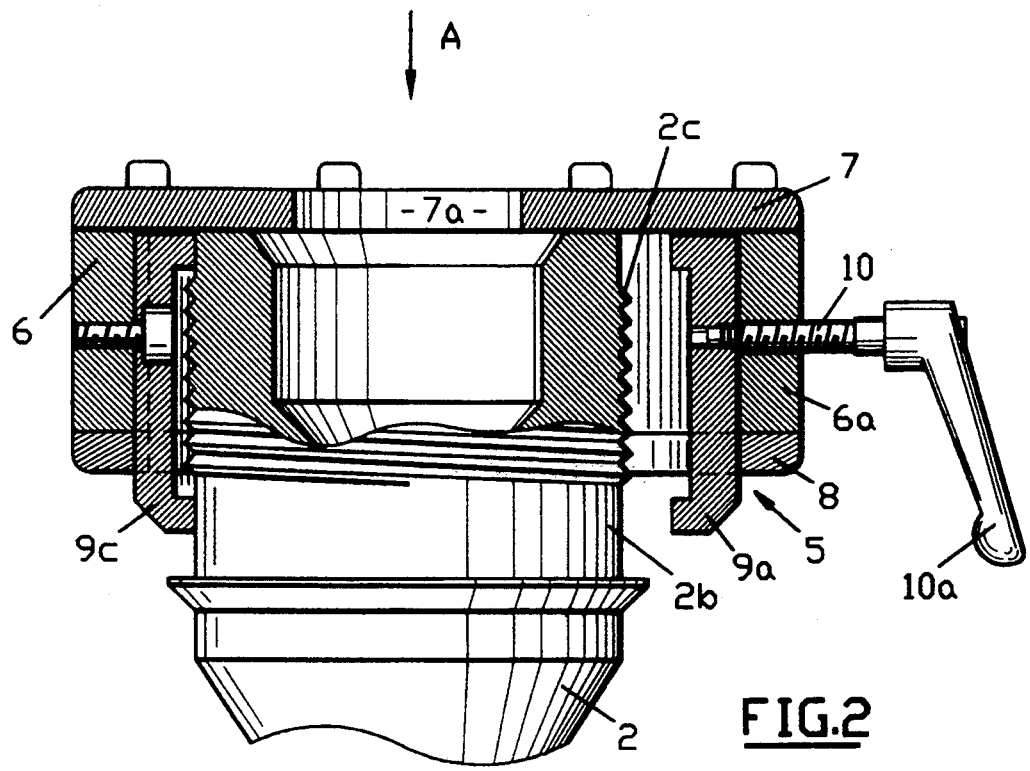
FIG. 2 is a sectional view through a vertical plane of a flange for fastening a tool intended for implementing a dye penetration inspection of the internal surface of an adapter.
Figure 2A:
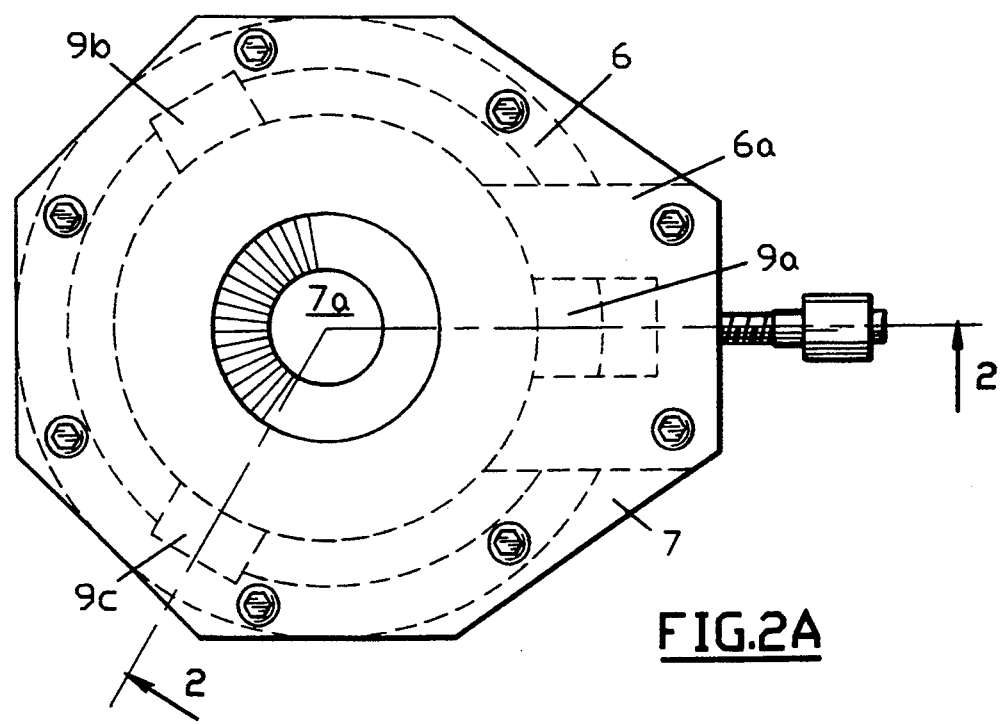
FIG. 2A is a plan view in the direction of arrow A of FIG. 2.

FIGS. 2 and 2A represent the upper part 2b of an adapter 2 on which a clamping assembly is engaged making it possible to install tooling, as will be described hereinbelow.

The clamping assembly 5 comprises a hoop 6, whose internal diameter is substantially greater than the diameter of the thread 2c of the upper part 2b of the adapter, and two plates 7 and 8 fastened to upper part and to lower part of the hoop 6, respectively.

The upper plate 7 comprises an opening 7a centered on the axis of the bore of the adapter 2, through which the tooling may be inserted inside the adapter as will be explained later.

The clamping assembly 5 also comprises three jaws 9a, 9b and 9c arranged at 120° about the axis of the opening 7a which is placed along the axis of the bore of the adapter when the clamping assembly is installed.

The two jaws 9b and 9c are mounted and fastened by screws, in recesses inside the hoop 6.

The jaw 9a is mounted for movement inside a recess made in a piece 6a attached by welding to the hoop 6 and to the inside of a recess made in the lower plate 8.

A maneuvering screw 10 on which there is fastened a handle 10a is engaged in a tapped hole passing through the piece 6a and comprises a smooth end having a groove engaged and mounted to move freely in the jaw 9a.

A pin makes it possible to hold the end of the screw 10 inside the piece 9a while leaving it free to rotate.

In FIG. 2 shows, the jaw 9a in its unclamped position which makes it possible to engage the clamping assembly 5 onto the end of the adapter, the jaws 9b and 9c comprising bearing parts coming into contact with the upper part 2b of the adapter 2 on the smooth cylindrical parts of the adapter which are recessed with respect to the threaded part 2c.

The clamping assembly 5 is fastened by turning the handle 10a in order to move the jaw 9a into a clamping position against the smooth external surface of the upper part of the adapter, by means of the screw 10.

Figure 3A:
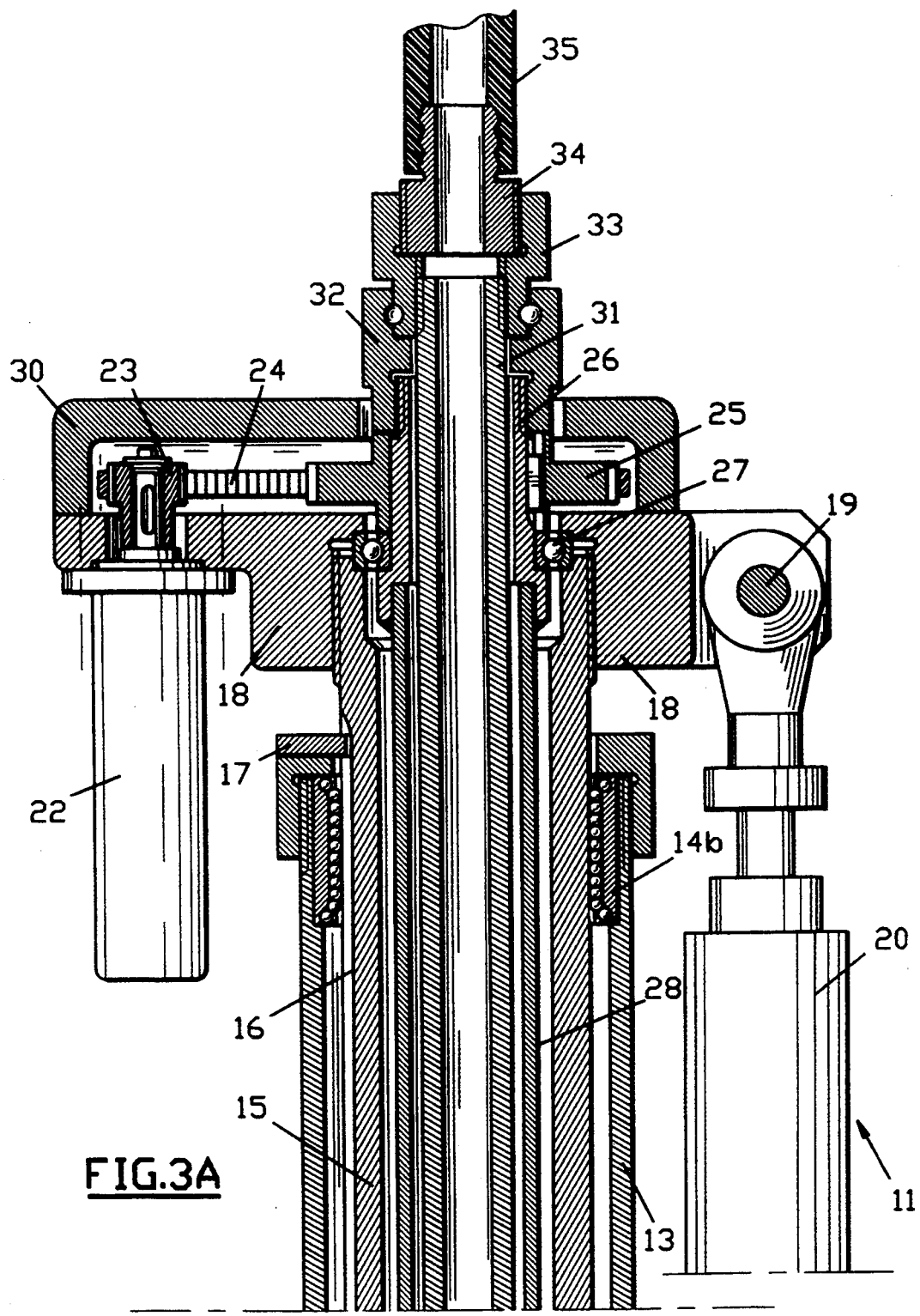
FIGS. 3A and 3B are respectively vertical sectional views of the upper and lower parts of a device making it possible to perform the operations of preparing the internal surface of an adapter and of implementing a dye penetration operation on the internal surface of the adapter.
Figure 3B:
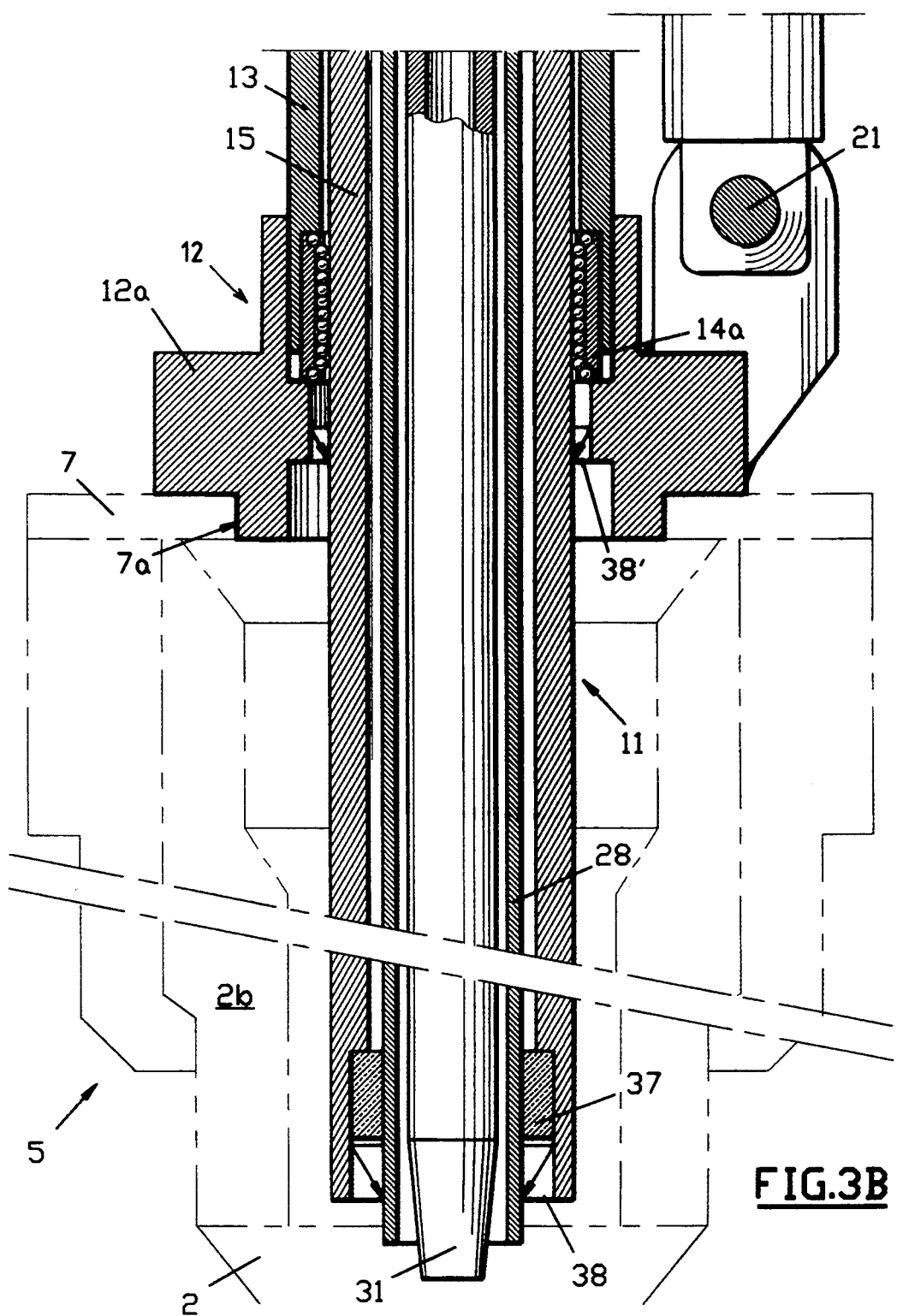

The adapter, equipped with the clamping assembly 5, is ready to receive tooling such as that represented in FIGS. 3A and 3B and making it possible to carry out various operations prior to inspecting the internal surface of the adapter by dye penetration, as well as certain operations actually using dye penetration inspection.

FIG. 3A and 3B show tooling 11 to be installed on the upper part of the adapter and intended to perform various cleaning operations of the internal surface of the adapter prior to the dye penetration, as well as various operations during the dye penetration inspection.

The upper part 2b of the adapter has previously been equipped with a clamping assembly 5 such as described hereinabove and represented in FIGS. 2 and 2A.

The tooling 11 comprises a lower sleeve 12 comprising a cylindrical end whose diameter allows it to be fitted with practically no clearance inside the opening 7a of the plate 7 of the clamping assembly 5.

The fastening of the tooling 11 to the clamping assembly 5 and to the adapter 2 is supplemented by rapid-acting clamps (not shown) coming to bear or the upper surface of a collar 12a of the sleeve 12 and on the lateral surface of the clamping assembly 5.

The tooling 11 is made up of a set of coaxial tubes fastened in coaxial position inside the bore of the sleeve 12.

A first tube 13, rigidly integral with the sleeve 12, constitutes the fixed part or shaft of the tooling inside which the moving part of the tooling is mounted for axial sliding movement by means of linear ball bearings 14a and 14b.

The moving part of the tooling mounted so as to slide in the shaft 13 comprises a tubular spindle 15 having a longitudinal groove 16 machined on its outer surface in which there is engaged a finger 17 integral with the upper part of the shaft 13 and providing axial guidance for the spindle 15 inside the shaft 13.

The upper parts of spindle 15 is integral, with a panel 18 carrying a pin 19 on which there is articulated a clevis constituting the end of the rod of a pneumatic jack 20 whose lower part is fastened so as to be articulated onto the sleeve 12, by means of a pin 21.

The jack makes it possible to move the moving assembly of the tooling 11 comprising the spindle 15, in axial translation, so as to move the active part of the tooling inside an adapter on which the tooling 11 is placed in the manner represented in FIG. 3B.

The panel 18 also carries a drive motor 22 whose output shaft carries a pinion 23 meshing with a toothed belt 24, itself engaged over a pinion 25 rotationally integral with a sleeve 26 fastened to the end of a tubular shaft 28 arranged coaxially and mounted so as to move in rotation about its axis, by means of a ball bearing 27, inside the spindle 15 of the tooling 11.

Owing to this mounting, the spindle 28 may be moved in axial translation with the spindle 15, inside the shaft 13 and the adapter 2, and may simultaneously be driven in rotation about its axis by means of the motor 22.

A cover 30 covers the upper part of the plate 18 and protects the pinions 23 and 25 and the toothed belt 24.

A tubular member 31 constituting the active part of the tooling 11 is mounted coaxially inside the shaft 28 removably and fastened to the shaft 28, by means of a ball coupling 32 whose balls may come to engage in a groove machined in the outer surface of the sleeve 33 integral with the upper part of the tubular element 31.

An end fitting 34 is fastened by means of the sleeve 33 to the end of the tubular element 31, so as to provide the connection for a flexible pipe 35 with the end of the tubular element 31, during certain phases of the dye penetration inspection operations.

The lower part of spindle 28 is mounted rotationally inside the spindle 15, by means of a bearing 37.

A seal 38 provides sealing between the components and 28 which can move in rotation with respect to each other.

A seal 38' is also interposed between the spindle 15 capable of moving in axial translation and the sleeve 12 fastened on the upper part of the adapter.

As will be explained hereinbelow, in the description of the operation of the tooling represented in FIGS. 3A and 3B, the tubular element 31 may have various forms to make it possible selectively to perform the various operations prior to the actual dye penetration inspection and various operations of the inspection itself.

The element 31 which is mounted coaxially inside the spindle 28 rotating inside the spindle 15, comprises a lower end projecting outside the spindle 28 and constituting the active part of the tooling 11.

This end may carry a brush for cleaning the internal surface of the adapter, an element for wiping this surface or even sprinkling nozzles communicating with the internal bore of the element 31 constituting a supply duct for the nozzles receiving liquid via the upper part of the element 31 connected to the flexible pipe 35 by means of the end fitting 34. The implementation of the operations prior to the dye penetration carried out inside an adapter 2 using the tooling 11 will now be described, with reference to FIGS. 3A and 3B.

The tooling 11 is installed and fastened to an adapter, by means of the sleeve 12 which is inserted into the opening 7a of the clamping assembly 5 fastened to the adapter 2.

The lower part of the spindle 15 located outside the shaft 13 is inserted into the bore of the adapter 2, so that the lower end of the spindle 28 and of the tubular element 31 is situated in the lower part of the adapter, below the zone 4 for welding the adapter to the vessel head 1.

A tubular element 31 on the lower end of which there is mounted a brush for cleaning the internal bore of the adapter is fastened coaxially inside the spindle 28, by means of the ball coupling 32.

The motor 22 is switched on, which makes it possible to rotate the spindle 28, and thus the tubular element 31, inside the adapter.

The jack 20 is powered, so as to produce an axial movement of the spindle 15, of the spindle 28 and of the tubular element 31 with an amplitude of the order of 500 mm, upwards and downwards, the spindle 28 and the tubular element 31 carrying the brush being set in rotation.

Two complete to-and-fro movements are carried out, following which the motor 22 is stopped.

The spindle 15 in which the moving assembly of the tooling 11 is fastened is placed in the upper position, and the tubular element 31 is extracted from the spindle 28.

The brush is disconnected from the end of the tubular element 31 and is replaced by a bottle brush on which are fastened cloths soaked in a degreasing substance such as trichloroethylene.

The motor 22 is switched on and several successive to-and-fro movements are again carried out by the moving assembly of the tooling inside the adapter.

The cleaning operation is recommenced under identical conditions, changing the cloths of the bottle brush, until the cloth emerges clean, inspection being carried out visually.

The operations prior to dye penetration inspection are then completed.

A tubular element 31 comprising an annular sprinkling nozzle at its end and constituting a hollow needle which is connected, at its upper end, to a flexible liquid supply pipe is then installed inside the spindle 28.

At least one to-and-fro movement is carried out in translation inside the adapter while supplying the duct with a liquid penetrant habitually used in the metallurgy field for nondestructive dye penetration inspections.

The penetrant is applied at a pressure less than 2 bar by carrying out at least two to-and-fro movements of the assembly which can move in translation, coming to stop in the bottom position.

The sprinkling hollow needle is disconnected and is extracted from the tooling 11.

There is then mounted on the tooling 11, a bottle brush equipped with cloths identical to the bottle brush which was used for the cleaning prior to installing the penetrant. Several to-and-fro movements of the bottle brush are carried out inside the adapter in order to wipe off the excess penetrant which has not been absorbed by the possible faults of the surface of the adapter.

There is then installed a duct identical to the duct which was used for installing the penetrant, on the tooling 11. The duct is then supplied with pure water by means of the flexible pipe 35 connected to its upper end.

The internal surface of the adapter is washed with water at a pressure less than two bar by carrying out a maximum of two to-and-fro passes inside the adapter. The machine is stopped in the bottom position.

The spray duct is disconnected and extracted from the tooling 11.

The cloth-carrying bottle brush is then used for cleaning the internal surface of the adapter.

The cleaning is considered finished when the cloth emerges clean.

Developer is then applied in the zone of the adapter subjected to the dye penetration.

The machine is placed in the bottom position and a duct fitted with a spray nozzle is installed on the tooling 11.

The duct is supplied with a developer liquid such as used for non-destructive dye penetration inspection operations in metallurgy.

Developer is deposited on the internal surface of the adapter at a pressure less than two bar by carrying out a single to-and-fro pass of the moving assembly of the tooling 11 inside the adapter. The machine is stopped in the bottom position.

The tooling 11 is dismantled, by undoing the rapid acting fastening clamps and separating the sleeve 12 from the clamping assembly 5, which remains in position on the adapter.

The dye penetration is then interpreted by borescope examination using the device which will be described hereinbelow with reference to FIGS. 4A, 4B and 5.

The device has been shown in the service position on the upper part 2b of an adapter 2 equipped with a clamping assembly 5 such as described and represented in FIG. 2.

The device allowing the borescope examination comprises a centering component 40 integral with a motor support plate 41 made in two parts 41a and 41b which constitutes the lower part of the device.

In the service position of the device on the upper part 2b of an adapter, the centering component 40 is engaged in bore 7a of the plate 7 of the clamping device 5 and the motor support plate 41 rests on the plate 7 of the clamping assembly.

The device also comprises a upper plate 42 made in two parts 42a and 42b, constituting an encoder support plate.

Figure 5:
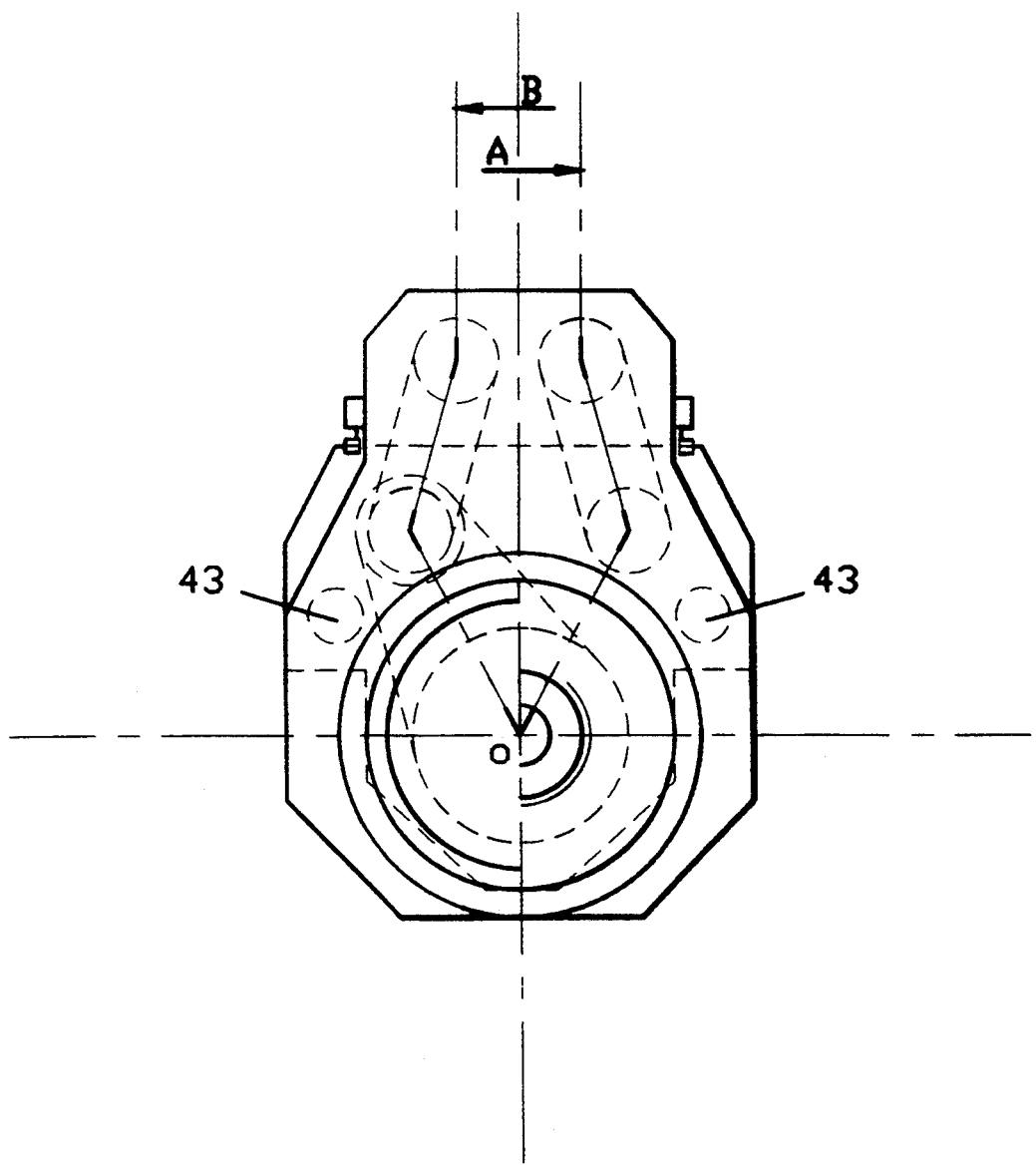
FIG. 5 is a plan view of the device allowing the implementation of the borescope examination.

The two plates are in parallel arrangements and are assembled by vertical columns 43, which can be seen in FIG. 5.

Inside the motor support plate 41, between its elements 41a and 41b, two pinions 44 and 45 respectively integral with the output shaft of motorized reduction gears 46 and 47 are rotatably mounted.

Inside the plate 41 there is also rotatably mounted a pinion 49 integral with one end of a screw 50 whose other end is mounted for rotation in the encoder support plate 42 and carries a pinion 41.

A toothed belt 53 meshes with the pinion 45 and, with the pinion 49 and makes it possible to drive the screw 50 in rotation, using the motor 47.

The motor support 41 also contains a pinion 36 mounted for rotation and integral with one end of a splined shaft 48 whose other end, which carries a pinion 54, is mounted for rotation in the encoder support plate 42.

A belt 52 makes it possible to drive the pinion 36 and the splined shaft 48 in rotation, using the motor 46.

A carriage 60 made in two parts 60a and 60b is driven in translation in the axial direction by the screw 50, by means of a ball nut 62 engaged with the screw 50 and fixedly mounted inside the carriage 60.

Inside the carriage 60, there is mounted in rotation a drive pinion 64 inside which there is fastened a holding clamp 65 which is clamped and unclamped using a manually tightened nut 66.

The clamp 65 makes it possible to provide the link between a borescope support 70 and the carriage 60.

The carriage 60 driven in axial translation makes it possible to move the borescope support in the axial direction of the adapter, when the device is in its service position represented in the drawings.

The internal surface of the adapter is thus scanned, in the zone subjected to the dye penetration inspection.

Furthermore, the pinion 67 mounted for rotation in the support 60 comprises a splined internal bore allowing it to be engaged on the splined shaft 48.

In this way, the pinion 67 is integral in rotation with the splined shaft and capable of moving in translation in the axial direction of the splined shaft, during the movements of the carriage 60.

A belt 68 makes it possible to drive the pinion 64, the clamp 65 and the borescope support 70 in rotation, by means of the pinion 67, when the motor 46 is actuated in order to drive the splined shaft 48 in rotation.

The internal surface of the adapter is thus scanned, in the zone subjected to the dye penetration, by successive steps, in translation along a generatrix, and in rotation, i.e., successive cylindrical zones.

Inside the borescope support 70 of tubular shape, there is arranged, in the axial direction, an optical fiber, slightly projecting with respect to the borescope support at its end engaged in the adapter, and it is connected at its other end via a rotating junction, to a means for supplying light radiation and for picking up light signals transmitted by the fiber from the borescope.

In order to determine, at any instant, and very precisely, the position of the borescope inside the adapter, two encoders 69 and 71 are used, which are mounted on the encoder support plate 42 and which comprise a rotary spindle on which is fastened a pinion, 72 and 74, respectively.

The pinion 72 integral with the shaft of the encoder 71 is driven in rotation by a toothed belt 73 meshing with the pinion 54 integral with the end of the splined shaft 48.

The encoder 71 thus makes it possible to determine, at any moment, the orientation of the fiber from the borescope about the axis of the adapter.

The pinion 74 integral with the spindle of the encoder 69 is driven in rotation by a toothed belt 75 meshing with the pinion 51 integral with the end of the screw 50.

The encoder 69 thus makes it possible to determine, at any moment, and with great precision, the position of the end of the fiber from the borescope in the axial direction of the adapter 2.

The revolving connector of the borescope is connected to a control station where the information transmitted by the fiber and by the encoders 69 and 71 is processed and recorded, so as to allow detection of possible cracks revealed by the dye penetration, as well as very precise location and dimensional determination of these cracks.

There is thus available by virtue of the borescope examination device, extremely precise information on the presence of cracks on the internal surface of the adapter, which makes it possible to specify the location of the cracks, denoted by the term "cartography".

If one or more cracks are detected, the internal surface of the adapter is excavated by machining, using a device such as represented in FIGS. 6A, 6B, 6C, 6D and 7.

The machining device shown makes it possible to carry out an excavation on the internal surface of the adapter, in the zone having cracks which have been identified and located very precisely by the operations which have been described hereinabove.

Figure 6A:
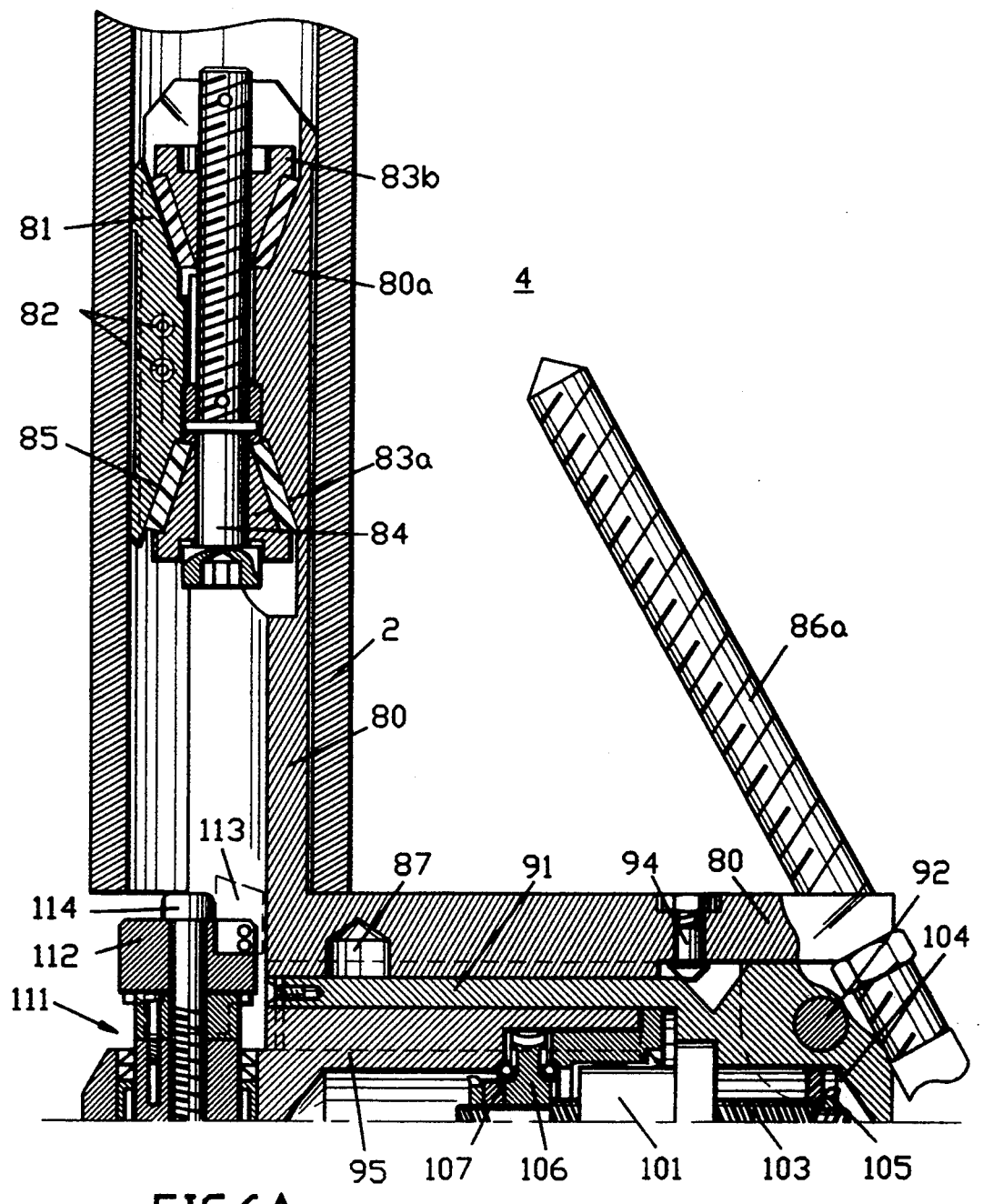
FIGS. 6A and 6B are respectively sectional views through a vertical plane of the upper and lower parts of a machining machine making it possible to excavate the internal surface of an adapter.

As can be seen in FIG. 6A, the excavation of the crackd internal surface of the adapter by machining is carried out via the lower part of the adapter 2, below the head 1 to which the adapter 2 is fastened by the welded joint 4.

The machining device comprises a frame 80 an upper part 80a of which in the form of a portion of a cylinder is inserted inside the adapter 2.

A shoe 81 is mounted on the part 80a of the frame, by means of screws 82 engaged with clearance inside the circular openings passing through the shoe 81.

The shoe 81, which is engaged in a cut inside the part 80a of the frame, has a certain capability for moving in the radial direction, making it possible to clamp the shoe and the frame inside the adapter 2 and therefore to fasten the machining device under the lower part of the adapter.

Two wedges 83a and 83b axially penetrated by openings one of which is tapped are engaged on a clamping screw 84 and comprise opposing inclined faces which bear on elastomer wipers 85 interposed between the wedges 83a and 83b and the inclined faces of the clamping shoe 81.

The machining device is installed in the lower part of the adapter in an orientation which is defined as a function of the position of the cracks and fastened in position by tightening the screw 84 making it possible to provide relative axial movement of the wedges 83a and 83b in the direction for bringing them together and clamping the shoe 81 against the internal surface of the adapter, by means of the elastomer shoes 85.

Two adjustable support feet 86a and 86b (FIG. 7), which are made to bear on the lower part of the head in the vicinity of the welded joint 4, are also mounted on the frame 80 of the machining device, in order to take up the torque, during the machining of the internal surface of the adapter.

In this way, the device, which is clamped inside the adapter and held by the support feet 86a and 86b remains stable during machining a making it possible to excavate the internal surface of the adapter.

The frame 80 of the tooling is mounted on the adapter 2 by using a support foot which is inserted into an opening 87 at the lower part of the frame 80.

The orientation of the part 80a of the frame inside adapter 2 is produced by use of a jig which is fastened onto the lower part of the frame 80 and which comprises indexing means aligned with marks made on the adapter in circumferential positions corresponding to the position of the cracks which have been identified and located, using a borescope.

When the frame 80 of the tooling is positioned inside the adapter, the tooling 90 is installed on its lower part.

The tooling 90 comprises a sole plate 91 for fastening, which is placed in alignment with openings of the frame 80, when the sole plate 91 is attached against the lower surface of the frame 80. An assembly spindle 92 is then inserted in the aligned openings of the frame 80 and of the sole plate 91.

The sole plate 91, as can be seen in FIG. 6D, also comprises a groove 91a in which there is inserted a projection of the frame 80, when the sole plate 91 is folded down by pivoting about the spindle 92 against the lower part of the frame 80.

Screws 93a and 93b engaged in plugs mounted articulated on the frame 80 are folded down so as to engage in recesses in the sole plate 91. By tightening the screws 93a and 93b, the sole plate and the tooling assembly 90 is fastened to the frame 80.

Figure 6B:
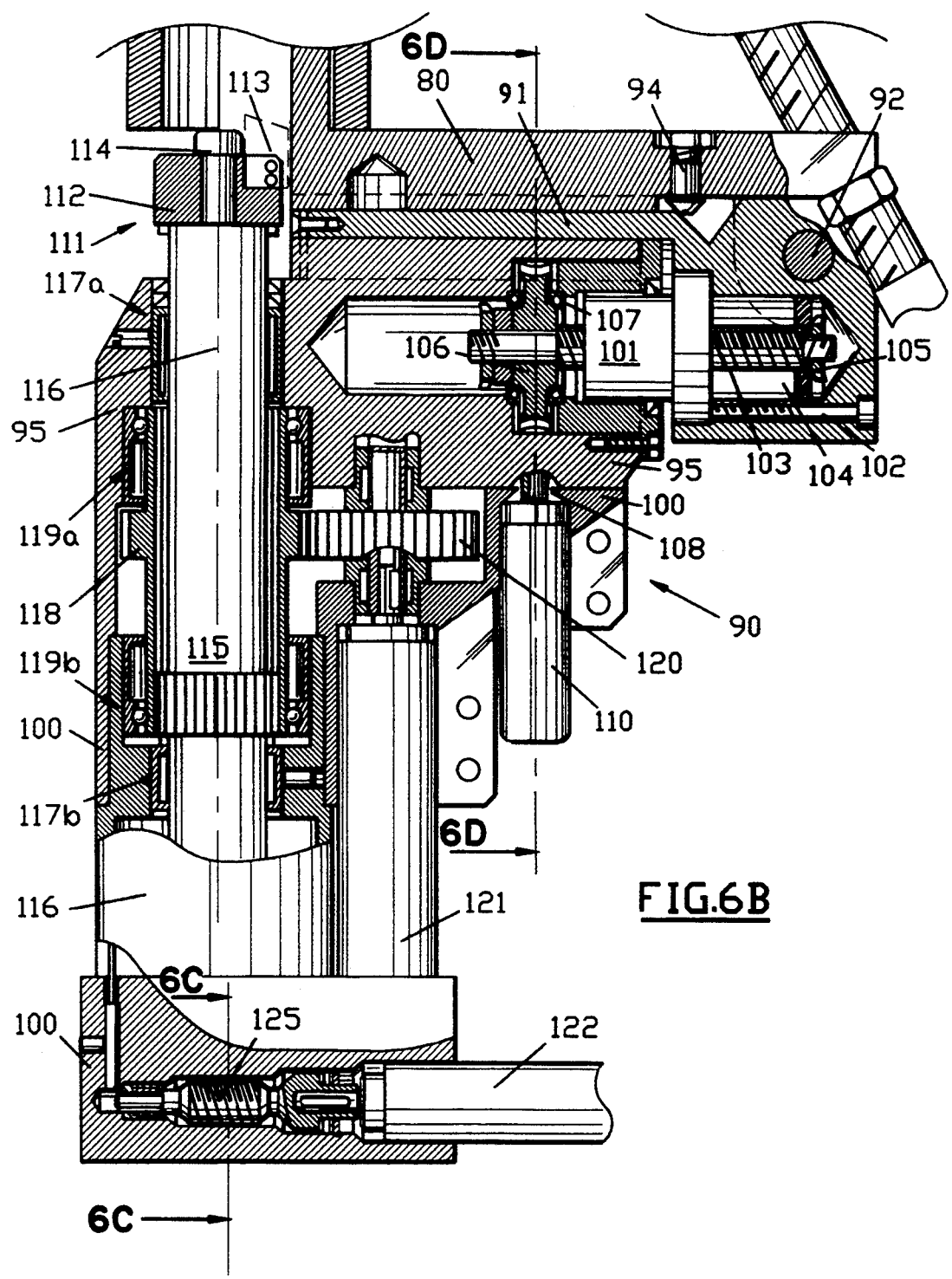

As can be seen in FIG. 6B, a stop 94 fastened into an opening of the frame 80 comes to bear via its conical lower part on an inclined part of the sole plate 91, so as to allow precise positional adjustment of the tooling 90 under the frame 80.

Figure 7:
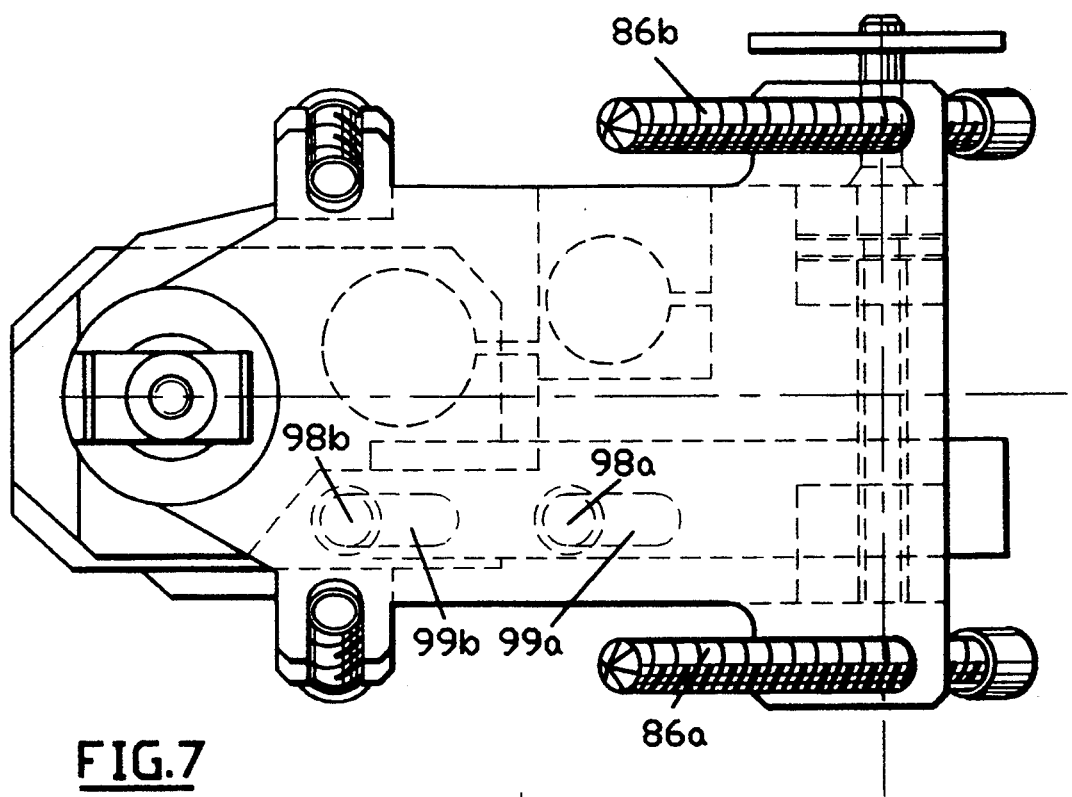
FIG. 7 is a plan view of the machining device represented in FIG. 6.

The tool 90 comprises an upper slide 95 which is mounted for limited sliding movement over the sole plate 91, in a horizontal direction perpendicular to the axis of the frame 80 and of the adapter, by virtue of a dovetail assembly 96 and of screws 98a and 98b engaged in oblong openings 99a and 99b of the upper slide 95 (FIG. 7).

The transverse movement of the upper slide 95, in the manner which will be described hereinbelow, makes it possible to advance the cutting machining tool, in a radial direction of the wall of the adapter, so as to adjust the depth of the pass.

A ball nut 101 is fastened by tie rods 102 to the sole plate 91o A screw 103 is engaged inside the ball nut 101 and mounted so as to move in translation and in rotation inside an opening 104 of the sole plate 91, by means of an assembly 105 fastened to the end of the screw and mounted for sliding movement in the opening 104.

The end of the screw 103 opposite the sliding assembly 105 is integral with a pinion 106 mounted so as to rotate in the upper slide 95 by means of ball bearings 107 and meshing with a worm 108 integral with the end of the shaft of a motor 110 and mounted to rotate in the upper slide 95.

The body of the motor 110 is fastened to a lower slide 100 attached and fastened under the upper slide 95.

By rotating the motor 110, the upper slide 95 and the lower slide 100 carrying the actual cutting tool 111 are made to move in the radial direction of the wall of the adapter 2, in order to adjust the depth of pass.

The cutting assembly 111 comprises a tool support 112 on which three cutting tools 113 made up of high-speed steel bars are screw-fastened.

The tool support 112 is fastened by a screw 114 to a splined shaft 115 mounted to rotate by means of roller bearings 117a and 117b inside housings located in the extension of each other and provided inside the upper and lower slides 95 and 100.

The axis 116 of the bearings 117a and 117b constituting the axis of rotation of the splined shaft 115 and of the cutting tool 113 is parallel to the axis of the adapter and offset with respect to this axis, in order to allow machining of the internal wall of the adapter to a certain depth, which is adjusted by transverse movement of the slides by using the pass depth adjusting motor 110, as described hereinabove.

When the position of the slide has been adjusted in order to obtain a certain pass, this position is fixed by tightening the screws 98a and 98b.

The splined shaft 115 is furthermore engaged inside a drive pinion 118 mounted so as to rotate by means of ball bearings 119a and 119b in the slides 95 and 100. The drive pinion 118 is internally splined, so as to be able to drive the splined shaft 115 in rotation while allowing the splined shaft 115 the possibility of moving in the axial direction.

The pinion 118 is driven by means of a drive pinion 120 fastened to the shaft of a motor 121 mounted in the lower slide 100.

The splined shaft 115 on which the tool support 112 and the tools 113 are fastened may thus be driven in rotation about its axis.

Furthermore, in order to obtain the movement of the tool in the direction of the axis 116 which constitutes the direction of advance of the machining parallel to the axial direction of the adapter 2, a motor 122 is fastened into the lower slide 100 and comprises a shaft on which a worm 125 is mounted so as to rotate inside the lower slide 100.

As can be seen in FIG. 6C, the screw 125 meshes with a pinion 126 integral with the end of a screw 127 and mounted for rotation inside the lower slide 100.

A ball nut 128, integral with a thrust component 129, is engaged on the screw 127.

The thrust component 129 is mounted so as to move in translation on columns 131 integral with the lower slide 100 and comprises a part engaged inside a groove machined in the splined shaft 115.

When the motor 122 is rotated, the worm 125 drives the pinion 126, so that the screw 127 set in rotation moves the ball nut 128, the drive component 129 and the splined shaft 115 in axial translation in the direction 116.

In this manner, the splined shaft 115 may be moved in the axial direction 116 constituting the direction of advance of the machining, and may simultaneously be set in rotation by the motor 121 in order to carry out an excavation of the internal surface of the adapter 2, by virtue of the cutting tool 113, in the zones having cracks.

Figure 8:
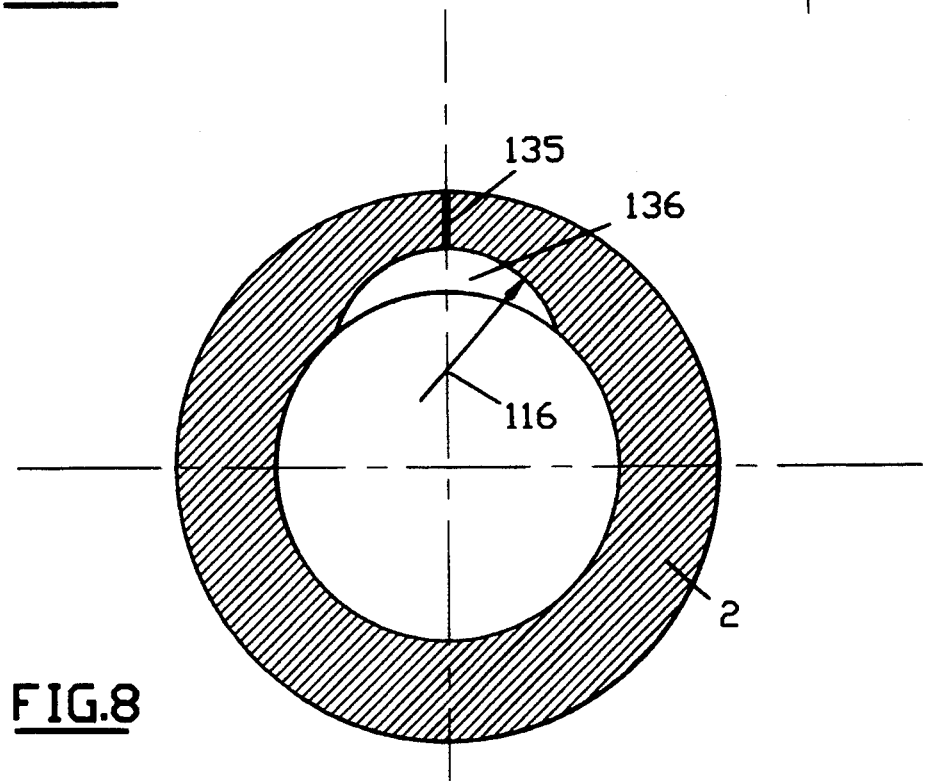
FIG. 8 is a cross-sectional view of an adapter, at the beginning of an excavation operation using machining of its internal surface.

As can be seen in FIG. 8, in the case of a crack 135 passing through the wall of the adapter 2 over a certain axial length and through substantially all of its thickness, after having located the crack, an excavation is carried out in a zone 136, by machining, using the device represented in FIGS. 6, 6A, 6B, 6C, 6D and 7.

Before installing the machining device inside the adapter 2 via its upper part, it may be necessary to make a cut in the lower end of the adapter projecting below the head. Such a cut 140 is shown in FIG. 1 (dotted line). This cut in the lower end of the adapter may, if necessary, only be carried out before building back up.

The zone 136 has, inside the wall of the adapter 2, a circular contour corresponding to the trajectory of the external part of the tool 113 rotating about the axis 116 of the tooling 90.

Machining is carried out in several passes. A first pass of a depth of 3 mm is carried out in the radial direction of the wall of the adapter, then an inspection is carried out in order to determine whether the crack is still apparent on the external surface of the excavated zone.

If the crack is no longer apparent, this crack having a penetration depth less than 3 mm, inside the wall of the adapter 2, the repair is considered to have been made, simply by building back up over a depth of 3 mm.

If the crack is still apparent on the external surface of the excavated zone 136, a new machining pass is carried out to a depth of 4 mm.

The internal surface of the excavated zone 136 is inspected. If the crack 135 is still apparent on the external surface of the zone 136, the crack is considered to be penetrant, as is the case of the crack 135 represented in FIG. 8.

In this case, it is necessary to build up the zone 136, in order completely to repair the fault.

Using a welding machine inserted inside the adapter, a layer of weld metal compatible with the metal of the adapter is laid down inside the excavation made in the zone 136.

The method according to the invention therefore makes it possible to carry out repairs by excavating the surface of the adapter, or repairs by excavating and building back up, according to the severity of the fault inspected.

In all cases, optimum repair of faults is then ensured, while avoiding interventions which are not strictly necessary inside the adapter.

Furthermore, the dye penetration inspection method makes it possible not only to detect faults very reliably, but also to locate them and determine their shape and dimensions very precisely.

The interventions for repairing on the inside of adapters are therefore carried out in an optimal manner.

The method for detecting and locating the faults may be implemented by using non-destructive inspection methods of any type suited to inspecting tubular components in the field of nuclear energy, these inspection methods being used in conjunction with a dye penetration operation making it possible to locate the faults precisely.

The dye penetration operation may be carried out either from the lower or from the upper part of the head, as described above.

The repair operation comprising excavation of the internal surface of the adapter may make it possible simultaneously to repair several faults in one zone of the adapter, by machining in successive zones at the internal periphery of the adapter and by building the excavated zone back up.

The use of tools making it possible to machine with a pass depth which is determined as a function of the adapters and of the type of fault encountered may be envisaged.

Generally, the inspection and machining devices may differ from the devices described.

The movements of the inspection means and of the machining means in rotation and in translation inside the adapter may be produced by using a motorization means other than those which have been described.

We claim:

1. Method for repairing the internal surface of an adapter of tubular shape passing through a head of a nuclear reactor vessel cooled by pressurized water and fastened to the head by a weld, said method comprising the steps of
    (a) carrying out a detection and inspection of cracks on an internal surface of said adapter at least in a zone close to said weld, using remote inspection operations comprising at least one dye penetration inspection with remote borescope examination of cracks revealed by dye penetration;
    (b) excavating at least one excavation cavity by machining to a specified depth of each zone of said internal surface of said adapter having a crack; and
    (c) as a function of the result of a dye penetration inspection in each zone having a crack, building back up the zone after excavation.

2. Method according to claim 1, comprising the step of inserting tooling inside said adapter, into a position defined as a function of the location of the cracks using the dye penetration operation and making said excavation cavity by machining of said internal surface of said adapter by using said tooling.

3. Method according to claim 1, comprising the steps of
    (a) making a first excavation cavity to a first depth of pass in a radial direction of a wall of said adapter;
    (b) inspecting the external surface of the excavated zone in said wall of said adapter;
    (c) considering a crack as having been repaired if said crack is not detected on said external surface of said excavated zone;
    (d) carrying out additional machining at a second depth of pass in a radial direction inside said wall of said adapter, in the case when a crack is detected on said external surface of said excavated zone;
    (e) making a new inspection of said external surface of said excavated zone; and
    (f) building back up said excavated zone with a weld metal, in the case when said crack is detected on the new external surface of said excavated zone.

4. Method according to any one of claims 1 to 3, comprising carrying out the detection and inspection of cracks on said internal surface of said adapter through a first end of said adapter located above the head of the vessel, and making the excavation cavity by machining inside the adapter, through a second end of the adapter located below a head of said reactor vessel.

5. Method according to claim 4, comprising cutting a lower end of said adapter projecting below said head and then making said excavation cavity or building said internal surface of said adapter back up.

6. Method according to claim 1, comprising brushing and cleaning said internal surface of the adapter and then carrying out a crack detection and inspection using dye penetration on said internal surface of said adapter.

* * * * *